US012580697B2

(12) United States Patent (10) Patent No.: US 12,580,697 B2
Mu (45) Date of Patent: Mar. 17, 2026

(54) DATA TRANSMISSION METHOD AND STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 341 days.

(21) Appl. No.: 18/252,006

(22) PCT Filed: Nov. 6, 2020

(86) PCT No.: PCT/CN2020/127266
§ 371 (c)(1),
(2) Date: May 5, 2023

(87) PCT Pub. No.: WO2022/094971
PCT Pub. Date: May 12, 2022

(65) Prior Publication Data
US 2023/0412332 A1 Dec. 21, 2023

(51) Int. Cl.
H04L 5/00 (2006.01)
(52) U.S. Cl.
CPC .................................. H04L 5/0044 (2013.01)
(58) Field of Classification Search
None
See application file for complete search history.

(56) References Cited

U.S. PATENT DOCUMENTS

| | | | | |
|---|---|---|---|---|
| 2008/0225766 | A1* | 9/2008 | Roy ...................... | H04L 1/1835 |
| | | | | 370/310 |
| 2016/0278049 | A1 | 9/2016 | Nory et al. | |
| 2016/0295516 | A1* | 10/2016 | Su ......................... | H04W 52/24 |
| 2018/0160445 | A1 | 6/2018 | Babaei et al. | |
| 2018/0279258 | A1* | 9/2018 | Yasukawa ............. | H04L 5/0044 |
| 2018/0332611 | A1* | 11/2018 | Li ............................. | H04L 1/16 |
| 2019/0068333 | A1* | 2/2019 | Luo ........................ | H04L 1/1822 |
| 2020/0328869 | A1 | 10/2020 | Liu et al. | |

(Continued)

FOREIGN PATENT DOCUMENTS

| | | |
|---|---|---|
| CN | 103312391 A | 9/2013 |
| CN | 108632779 A | 10/2018 |
| CN | 109496440 A | 3/2019 |

(Continued)

OTHER PUBLICATIONS

"Radio resource selection behaviour for sensing and semi-persistent transmissions," Proceedings of the 3GPP TSG RAN WG2 Meeting #95, Panasonic, R2-164849, Aug. 22, 2016, Gothenburg, Sweden, 3 pages.

(Continued)

*Primary Examiner* — Steve R Young
(74) *Attorney, Agent, or Firm* — McCoy Russell LLP

(57) ABSTRACT
A data transmission method performed by a terminal, includes: determining a first transport block size; determining a relationship between a size of a service data packet and the first transport block size; and transmitting the service data packet based on the first transport block size, and transmitting an indication message based on the relationship between the size of the service data packet and the first transport block size.

19 Claims, 7 Drawing Sheets

(56)                 References Cited

U.S. PATENT DOCUMENTS

| | | | | |
|---|---|---|---|---|
| 2021/0352527 | A1* | 11/2021 | Sridharan | H04L 1/1822 |
| 2022/0104306 | A1* | 3/2022 | Shrestha | H04L 1/1812 |

FOREIGN PATENT DOCUMENTS

| | | |
|---|---|---|
| CN | 109565827 A | 4/2019 |
| CN | 109565868 A | 4/2019 |
| CN | 109644436 A | 4/2019 |
| CN | 110099420 A | 8/2019 |
| CN | 110621075 A | 12/2019 |
| CN | 110677883 A | 1/2020 |
| CN | 110999464 A | 4/2020 |
| CN | 111149411 A | 5/2020 |
| CN | 111479282 A | 7/2020 |
| IN | 201647039842 A | 12/2016 |
| WO | 2018228579 A1 | 12/2018 |
| WO | 2019095122 A1 | 5/2019 |
| WO | 2020033381 A1 | 2/2020 |

OTHER PUBLICATIONS

"3rd Generation Partnership Project; Technical Specification Group Services and System Aspects; Release 15 Description; Summary of Rel-15 Work Items (Release 15)," 3GPP TR 21.915 V0.0.1, Mar. 2018, 28 pages.

"3rd Generation Partnership Project; Technical Specification Group Services and System Aspects; Release 14 Description; Summary of Rel-14 Work Items (Release 14)," 3GPP TR 21.914 V14.0.0, May 2018, 103 pages.

"Sidelink Resource Allocation Mode-2 Design for Nr V2X Communication," Proceedings of the 3GPP TSG RAN WG1 Meeting #97, Intel Corporation, R1-1906796, May 13, 2019, Reno, Nevada, 18 pages.

"Resource Allocation Mode-2 for NR V2X Sidelink Communication," Proceedings of the 3GPP TSG RAN WG1 Meeting #98bis, Intel Corporation, R1-1910650, Oct. 14, 2019, Congqing, China, 28 pages.

"Resource Allocation for Mode 2," Proceedings of the 3GPP TSG RAN WG1 #99, Apple, R1-1912812, Nov. 18, 2019, Reno, Nevada, 9 pages.

"Discussion on SL Mode 2 left issues," Proceedings of the 3GPP TSG-RAN WG2 #109-e, Ericsson, R2-2000882, Revision of R2-1915378, Feb. 24, 2020, Electronic Meeting, 6 pages.

Xiong, L. et al., "Study on dynamic allocation strategies of wireless channel," Telecommunications for Electric Power Systems, vol. 26, No. 158, Dec. 10, 2005, 4 pages. (Submitted with English Abstract).

"Enhanced DL transmission for LTE," Proceedings of the TSG RAN meeting #46, CMCC, RP-091046, Dec. 1, 2009, Sanya, P.R. China, 6 pages.

"subPRB feature impact on MPR and A-MPR of CAT-M2 device," Proceedings of the 3GPP TSG-RAN4 Meeting #86bis, Ericsson, R4-1805137, Apr. 16, 2018, Melbourne, Australia, 23 pages.

* cited by examiner

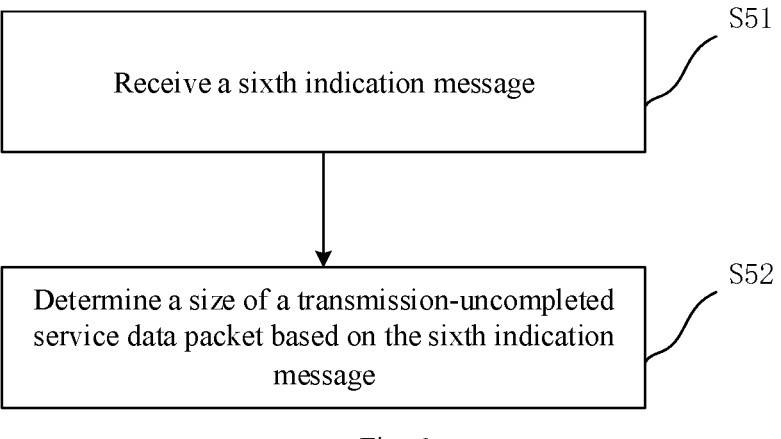

S51

Receive a sixth indication message

S52

Determine a size of a transmission-uncompleted service data packet based on the sixth indication message

Fig. 6

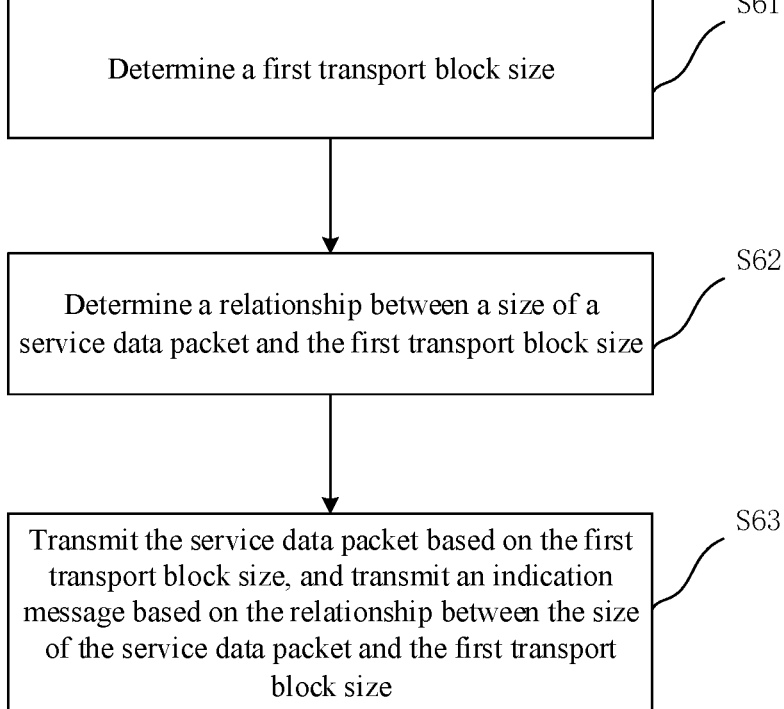

S61

Determine a first transport block size

S62

Determine a relationship between a size of a service data packet and the first transport block size

S63

Transmit the service data packet based on the first transport block size, and transmit an indication message based on the relationship between the size of the service data packet and the first transport block size

DATA TRANSMISSION METHOD AND STORAGE MEDIUM

CROSS REFERENCE TO RELATED APPLICATION

The present application is a U.S. National Phase of International Application No. PCT/CN2020/127266 entitled "DATA TRANSPORT METHOD, DATA TRANSPORT APPARATUS, AND STORAGE MEDIUM," and filed on Nov. 6, 2020. The entire contents of the above-listed application are hereby incorporated by reference for all purposes.

BACKGROUND

Extended reality (XR) is an important application scenario in a wireless technology. A current research into this kind of application scenario shows that enhancements are needed in more than one aspect such as a system capacity, mobility management, a coverage enhancement and power saving. To meet the requirement for the power saving in the XR application scenario, semi-persistent scheduling (SPS) is used in data scheduling to transmit data.

SUMMARY

The disclosure relates to the field of wireless communication, and provides a data transmission method, a data transmission apparatus and a storage medium.

According to a first aspect of examples of the disclosure, there is provided a data transmission method performed by a terminal. The data transmission method includes: determining a first transport block size; determining a relationship between a size of a service data packet and the first transport block size; and transmitting the service data packet based on the first transport block size, and transmitting an indication message based on the relationship between the size of the service data packet and the first transport block size.

According to a second aspect of the examples of the disclosure, there is provided a data transmission method performed by a network side. The method includes: determining a first transport block size; determining a relationship between a size of a service data packet and the first transport block size; and transmitting the service data packet based on the first transport block size, and transmitting an indication message based on the relationship between the size of the service data packet and the first transport block size.

According to a third aspect of the examples of the disclosure, there is provided a data transmission apparatus applied to a terminal. The data transmission apparatus includes: a terminal first determining module, configured to determine a first transport block size; a terminal second determining module, configured to determine a relationship between a size of a service data packet and the first transport block size; and a terminal transmission module, configured to transmit the service data packet based on the first transport block size, and to transmit an indication message based on the relationship between the size of the service data packet and the first transport block size.

According to a fourth aspect of the examples of the disclosure, there is provided a data transmission apparatus applied to a network side. The data transmission apparatus includes: a network first determining module, configured to determine a first transport block size; a network second determining module, configured to determine a relationship between a size of a service data packet and the first transport block size; and a network transmission module, configured to transmit the service data packet based on the first transport block size, and to transmit an indication message based on the relationship between the size of the service data packet and the first transport block size.

According to a fifth aspect of the examples of the disclosure, there is provided a data transmission apparatus, including: a processor; and a memory configured to store a processor-executable-instruction, where the processor is configured to execute the data transmission method of the first aspect or in any one example in the first aspect or execute the data transmission method of the second aspect or in any one example in the second aspect.

According to a sixth aspect of the examples of the disclosure, there is provided a non-transitory computer readable storage medium. When an instruction in the storage medium is executed by a processor of a mobile terminal, the mobile terminal is caused to execute the data transmission method of the first aspect or in any one example in the first aspect or the mobile terminal is caused to execute the data transmission method of the second aspect or in any one example in the second aspect.

BRIEF DESCRIPTION OF THE DRAWINGS

The accompanying drawings are incorporated into and form part of the specification, show examples that comply with the disclosure and are used for explaining principles of the disclosure together with the specification.

FIG. 6 is a flow diagram of yet another data transmission method according to an example of the disclosure.

FIG. 7 is a flow diagram of yet another data transmission method according to an example of the disclosure.

DETAILED DESCRIPTION

Figure 1:
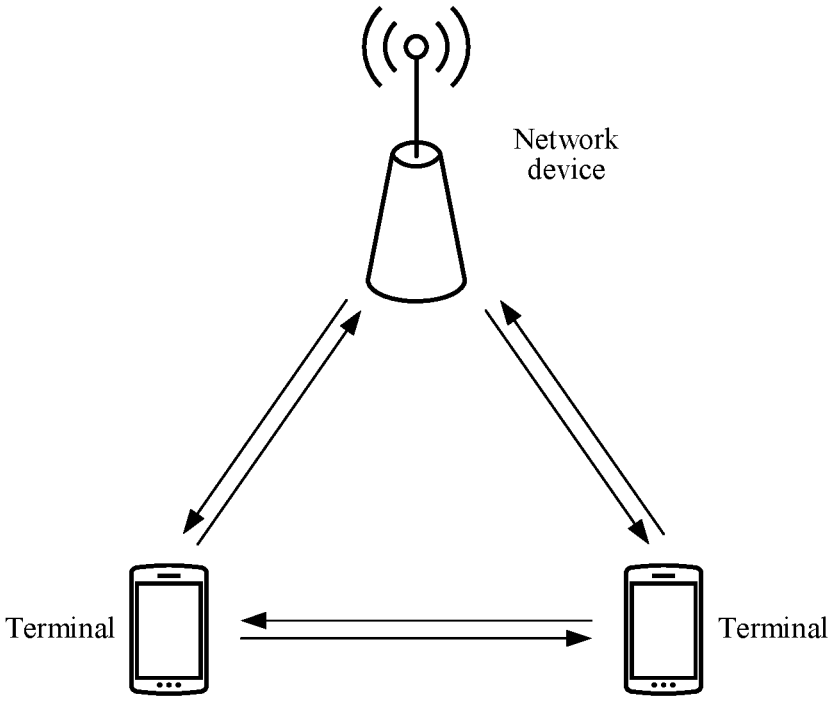
FIG. 1 is an architecture diagram of a communication system between a network device and a terminal according to an example of the disclosure.

Examples will be described in detail, which are shown in the accompanying drawings. When the descriptions below relate to the accompanying drawings, the same numbers in different accompanying drawings indicate the same or similar elements unless otherwise indicated. The implementations described in the following examples do not represent all implementations consistent with the disclosure. On the contrary, they are instances of apparatuses and methods that are consistent with some aspects of the disclosure as detailed in the appended claims.

Extended reality (XR) is an important application scenario in a wireless technology. A current research into this kind of application scenario shows that enhancements are needed in more than one aspect such as a system capacity, mobility management, a coverage enhancement and power saving. To meet the requirement for the power saving in the XR application scenario, semi-persistent scheduling (SPS) is used in data scheduling to transmit data.

In related art, data scheduling with a fixed transport block size (TBS) is supported in the SPS. That is, the TBS of each transport block in each SPS is the same, and a base station reserves resources according to a maximum TBS. However, a size of a data packet generated in the XR application scenario is variable, and if the resources are reserved still according to the maximum TBS, the resources may be wasted.

In a wireless communication system, there are important application scenarios such as an XR application scenario and a cloud-game application scenario. The XR application scenario further includes augmented reality (AR), virtual reality (VR) and mix reality (MR). Through the research of this kind of application scenarios, it is determined that the following aspects need to be enhanced: system capacity, mobility management, coverage enhancement, and power saving.

A device for XR is mainly headset device and an overall terminal-form is relatively small, so a battery capacity of a terminal is limited. On the other hand, services supported by the XR have the characteristics of a high speed and a large bandwidth, so the device consumes a lot of power and is prone to being heated up. It is known according to the above characteristics of the XR that this kind of wearable devices have a very high requirement for heat dissipation, and how to save power is also a very serious problem faced by this kind of terminals.

In a general data transmission process, a network first sends a physical downlink control channel (PDCCH), where the PDCCH carries scheduling information for subsequent data. The scheduling information for data includes a size of data-to-be-transmitted, resource allocation, a modulation and demodulation mode, and so on. As a result, when the terminal sends or receives the data, the terminal first needs to receive the PDCCH, and then sends or receives the data on specified resources according to a transport format of the PDCCH. However, in the communication system, there is a kind of services that occurs at a fixed period and has a relatively fixed size of data packet. As a result, in order to reduce the power consumption consumed by the terminal to detect the PDCCH, a mechanism of SPS/configured grant is introduced into the communication system. After the mechanism of SPS/configured grant is introduced into the communication system, the network may configure relevant data for data scheduling in advance. The relevant data for data scheduling includes a period of data sending, a period of data receiving, a size of a data packet, a transport format of data, and so on. The terminal will transmit or receive the data at a preset time according to a specified data format. In this way, the demodulation of the PDCCH may be avoided.

As a result, the mechanism of SPS/configured grant may be introduced into the XR terminal to reduce power overhead. In related art, transmission of the XR is periodic in general and the size of the data packet remains unchanged.

However, in some cases, the size of the data packet generated is variable in periodic moments. It is known according to a transmission mechanism of SPS/configured grant that the SPS/configured grant supports scheduling of a fixed TBS, that is, the TBS of a TB in each SPS transmission is the same. As a result, during data transmission, if resources are reserved according to a transport block size of a maximum data packet, the resources will be wasted. Based on this, the disclosure provides a data transmission method. According to the data transmission method provided by the disclosure, a TBS of a fixed size is configured. In the case that the configured TBS of the fixed size cannot transmit all data of current data packet, a network side may be indicated by a first indication message to continue to receive, based on a next transport block, the data packet, and thus the waste of resources is effectively reduced.

FIG. 1 is an architecture diagram of a communication system between a network device and a terminal according to an example of the disclosure. The data transmission method provided by the disclosure may be applied to the architecture diagram of the communication system shown in FIG. 1. As shown in FIG. 1, the terminal receives a service data packet and an indication message sent by a network-side device, and may send a service data packet to a network side.

It may be understood that the communication system between the network device and the terminal shown in FIG. 1 is schematically illustrated. A wireless communication system may further include other network devices, for example, the wireless communication system may further include a core network device, a wireless relay device, a wireless backhaul device, and so on, which are not shown in FIG. 1. The number of the network devices and the number of the terminals included in the wireless communication system are not limited in the examples of the disclosure.

It may be further understood that the wireless communication system according to the examples of the disclosure is a network that provides wireless communication functions. The wireless communication system may adopt different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA) and carrier sense multiple access with collision avoidance. According to capacities, rates, delays and other factors of different networks, the networks may be divided into a 2G (generation) network, a 3G network, a 4G network or a future evolution network, such as a 5G network. The 5G network may also be called a new radio (NR). For convenience of descriptions, the wireless communication network is sometimes called the network for short in the disclosure.

Furthermore, the network device involved in the disclosure may also be called a wireless-access-network device. The wireless-access-network device may be an access point (AP), a wireless relay node, a wireless backhaul node, a transmission point (TP) or a transmission and reception point (TRP), etc. in a base station, an evolved node B base station, a femtocell and a wireless fidelity (WIFI) system. The wireless-access-network device may also be a gNB in an NR system. Alternatively, the wireless-access-network device may be a component or part of the devices constituting the base station. In a vehicle-to-everything (V2X) communication system, the network device may be a vehicle-mounted device. It should be understood that a technology and a device form used by the network device are not limited in the examples of the disclosure.

Furthermore, the terminal involved in the disclosure may also be called a terminal device, a user equipment (UE), a mobile station (MS), a mobile terminal (MT), etc. The terminal is a device that provides voice and/or data connectivity to users. For example, the terminal may be a handheld device, a vehicle-mounted device, and so on with a wireless connectivity function. Some terminals are illustrated as a mobile phone, a pocket personal computer (PPC), a palm computer, a personal digital assistant (PDA), a laptop, a tablet computer, a wearable device, or a vehicle-mounted device, etc. In addition, in the vehicle-to-everything (V2X) communication system, the terminal device may also be a vehicle-mounted device. It should be understood that the example of the disclosure does not limit the technology and the device form used by the terminal.

In an example of the disclosure, there is provided a data transmission method. The following example will illustrate the data transmission method in combination with the accompanying drawings.

Figure 2:
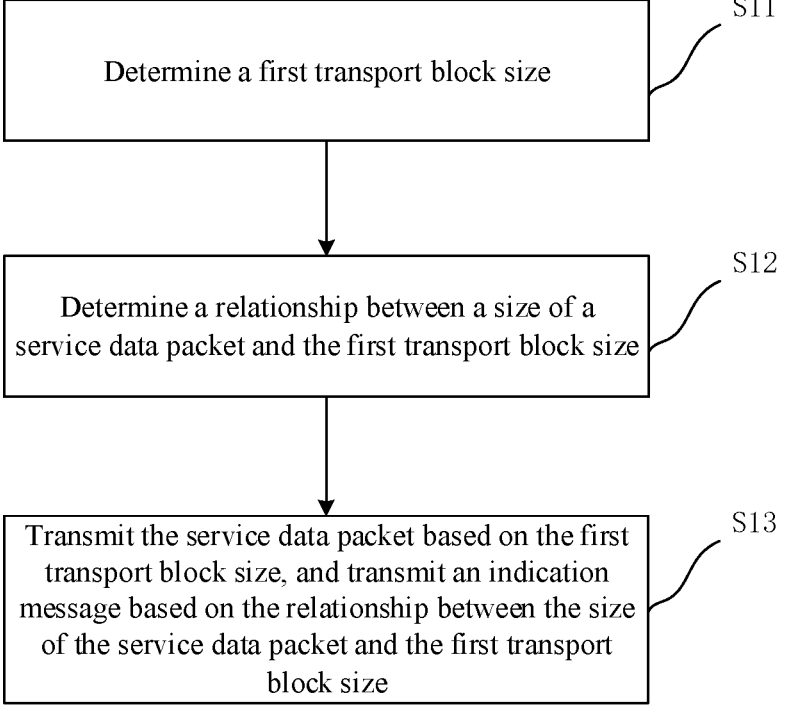
FIG. 2 is a flow diagram of a data transmission method according to an example of the disclosure.

FIG. 2 is a flow diagram of a data transmission method according to an example of the disclosure. As shown in FIG. 2, the data transmission method is performed by a terminal and includes steps S11, S12 and S13.

Step S11 includes determining a first transport block size.

In the examples of the disclosure, the terminal may be a terminal applied to XR and cloud-game scenarios. Descriptions of the terminal are not limited by the disclosure. The terminal involved in the disclosure may further be other types of terminals, which are not repeated here.

In an example of the disclosure, a base station reserves a resource of the first transport block size for the terminal. The resource of the first transport block size may be less than a maximum transport block size. The first transport block size may be determined by a network-side device based on a size of a general transmission service data packet. For example, in the case that data transmitted between the network-side device and the terminal is relatively concentrated in a size of 600 kb, the base station may determine the first transport block size as 600 KB. This is an instance, not a limit to the disclosure.

Step S12 includes determining a relationship between a size of a service data packet and the first transport block size.

In an example of the disclosure, the terminal may determine the relationship between the size of the service data packet and the first transport block size. The relationship between the size of the service data packet and the first transport block size may include one of the following: the size of the service data packet is greater than the first transport block size; and the size of the service data packet is less than or equal to the first transport block size.

Step S13 includes transmitting the service data packet based on the first transport block size, and transmitting an indication message based on the relationship between the size of the service data packet and the first transport block size.

In an example of the disclosure, the terminal transmits a data packet based on a configured/reserved resource of the first transport block size. In other words, the terminal transmits part or all of service data packets based on the first transport block size at a transmission occasion. In an example, the terminal determines that the size of the service data packet to-be-transmitted is greater than the first transport block size, so the terminal transmits the service data packet of the first transport block size at the transmission occasion, and indicates through the indication message that there is a transmission-uncompleted service data packet subsequently. In an example, the size of the service data packet to-be-transmitted is less than or equal to the first transport block size, so the terminal may indicate, after transmitting the service data packet at the transmission occasion, through the indication message that transmission of the service data packet is completed. In an example, transmission of the service data packet may be completed based on the first transport block size, the indication message for indicating that transmission of the service data packet is completed may not be transmitted, and a receiving end may stop receiving after receiving the service data packet at the transmission occasion.

Through the data transmission method provided by the disclosure, the resource of the first transport block size is reserved, instead of reserving the resource according to possible maximum transport block size, and the indication message may be sent to inform whether there is transmission-uncompleted service data packet subsequently, so that waste of the reserved resource may be avoided.

In some examples of the disclosure, the size of the transmitted service data packet is greater than the reserved first transport block size, a first indication message may be sent. The first indication message is configured to indicate that there is transmission-uncompleted service data packet. In an example, the size of the transmitted service data packet is less than or equal to the reserved first transport block size, a second indication message may be sent, where the second indication message is configured to indicate that there is no transmission-uncompleted service data packet. In an example, transmission of the service data packet may be completed based on the first transport block size, and the indication message may not be sent. In an example, transmission of the service data packet is not completed based on the first transport block size at the transmission occasion, and a third indication message may be sent, where the third indication message is configured to indicate a size of the transmission-uncompleted service data packet. According to the third indication message, a network side is informed of the size of the transmission-uncompleted service data packet.

In an example of the disclosure, different sequences may be configured for demodulation reference signals (DM-RSs) carried by the transmission. Whether there is the transmission-uncompleted service data packet is determined based on the different sequences of the demodulation reference signals. Through pre-defined information, the terminal may determine a sequence of demodulation reference signals corresponding to a case where there is the transmission-uncompleted service data packet, and determine a sequence of demodulation reference signals corresponding to a case where there is no transmission-uncompleted service data packet. According to the received sequence of demodulation reference signals corresponding to the case where there is the transmission-uncompleted service data packet, the first indication message is determined, and a third indication message may further be determined, where the third indication message is configured to indicate that the transmission-uncompleted service data packet needs to be transmitted on an extra resource.

In another example of the disclosure, a first transmission resource may be determined among a transmitted preset resource, and whether there is the transmission-uncompleted service data packet is determined based on a scheduling request sent by the first transmission resource. The scheduling request is configured to request a resource for transmitting the transmission-uncompleted service data packet.

In an example, there is the transmission-uncompleted service data packet, the scheduling request is sent on the first transmission resource, and the first indication message is determined according to the scheduling request. In an example, there is no transmission-uncompleted service data packet, the scheduling request is not sent on the first transmission resource, and it is further determined that transmission of the service data packet is completed; alternatively, the second indication message is determined, and it is determined, according to the second indication message, that transmission of the service data packet is completed.

In an example of the disclosure, it is determined that the first indication message and the third indication message are a first sequence, and the size of the transmission-uncompleted service data packet is greater than or equal to a first threshold. In other words, the determination of the first indication message and the third indication message being the first sequence implicitly indicates that a size of transmission-uncompleted service data packet following the service data packet transmitted at the transmission occasion is relatively large. In another example, it is determined that the first indication message and the third indication message are a second sequence, and the size of the transmission-uncompleted service data packet is less than or equal to the first threshold. In other words, the determination of the first indication message and the third indication message being the second sequence implicitly indicates that the size of the transmission-uncompleted service data packet following the service data packet transmitted at the transmission occasion is relatively small. In yet another example, it is determined that the second indication message is a third sequence, and there is no transmission-uncompleted service data packet. In other words, the determination of the second indication message being the third sequence implicitly indicates that transmission of the service data packet transmitted at the transmission occasion has been completed.

For example, three sequences of demodulation reference signals are configured for SPS transmission, including a sequence #1, a sequence #2 and a sequence #3. To facilitate descriptions, the first sequence may correspond to the sequence #1, the second sequence may correspond to the sequence #2, and the third sequence may correspond to the sequence #3. It may be determined based on a predetermined definition that: the sequence #1 indicates that there still has transmission-uncompleted service data packet following the service data packet transmitted at the transmission occasion, and the transmission-uncompleted service data packet is relatively large; the sequence #2 indicates that there still has transmission-uncompleted service data packet following the service data packet transmitted at the transmission occasion, and the transmission-uncompleted service data packet is relatively small; and the sequence #3 indicates that transmission of the service data packet transmitted at the transmission occasion has been completed.

In an example of the disclosure, the terminal sends the first indication message to inform the network side that there is transmission-uncompleted service data packet subsequently, and the terminal determines to detect a downlink control channel, where the downlink control channel is configured to schedule the transmission-uncompleted service data packet.

Figure 3:
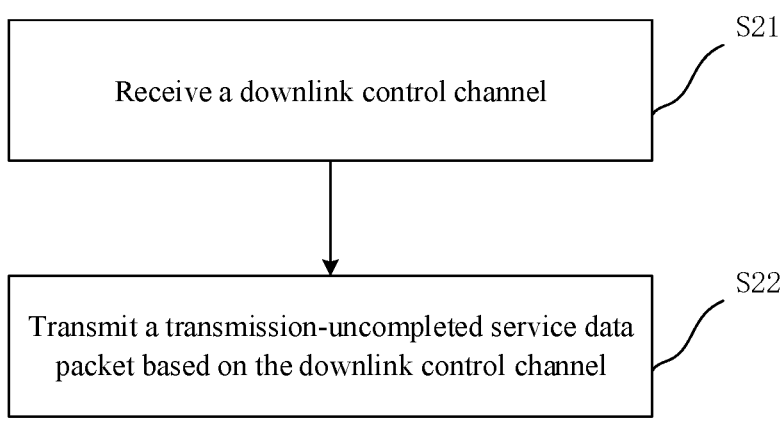
FIG. 3 is a flow diagram of another data transmission method according to an example of the disclosure.

FIG. 3 is a flow diagram of the data transmission method according to an example of the disclosure. As shown in FIG. 3, the data transmission method further includes steps S21 and S22.

Step S21 includes receiving a downlink control channel.

Step S22 includes transmitting a transmission-uncompleted service data packet based on the downlink control channel.

In an example of the disclosure, the terminal sends the first indication message, and it is determined that there is transmission-uncompleted service data packet subsequently, and a detection of corresponding PDCCH is started. After the PDCCH is received, the transmission-uncompleted service data packet is transmitted in the PDCCH.

In an example of the disclosure, the terminal transmits a service data packet to a base station but does not complete the transmission of the service data packet at the transmission occasion, so the terminal sends the first indication message to the base station. The base station determines, based on the received first indication message, a sequence corresponding to the first indication message, and further determines reserved resources. The reserved resources are resources reserved for transmitting, after an interval of a first number of time units since the first indication message is received, the transmission-uncompleted service data packet. The terminal continues to transmit, after an interval of a first number of time units since sending the first indication message, the transmission-uncompleted service data packet. The first number of time units may be X time units, where X is determined based on a predefined configuration.

Figure 4:
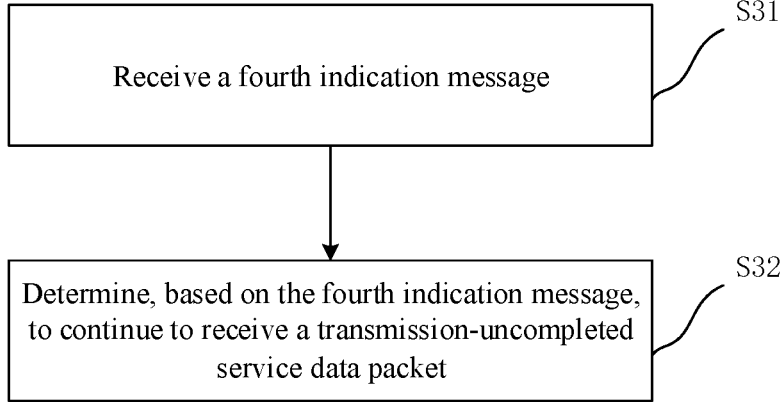
FIG. 4 is a flow diagram of yet another data transmission method according to an example of the disclosure.

FIG. 4 is a flow diagram of the data transmission method according to an example of the disclosure. As shown in FIG. 4, the data transmission method further includes steps S31 and S32.

Step S31 includes receiving a fourth indication message.

Step S32 includes determining, based on the fourth indication message, to continue to receive a transmission-uncompleted service data packet.

In some examples of the disclosure, the terminal determines, after receiving the fourth indication message, that there is a transmission-uncompleted service data packet in a service data packet transmitted by a network side, so the terminal continues to receive the transmission-uncompleted service data packet based on the fourth indication message. In an example of the disclosure, the network side determines, when sending the service data packet to the terminal, the sent indication message based on a relationship between the size of the service data packet and the first transport block size. In an example, the size of the transmitted service data packet is greater than the reserved first transport block size, and the fourth indication message may be sent. The fourth indication message is configured to indicate that there is the transmission-uncompleted service data packet. After receiving the fourth indication message sent by the network side, the terminal determines that there still has transmission-uncompleted service data packet following the service data packet transmitted based on the first transport block size at the transmission occasion, and determines to continue to receive the transmission-uncompleted service data packet.

Figure 5:
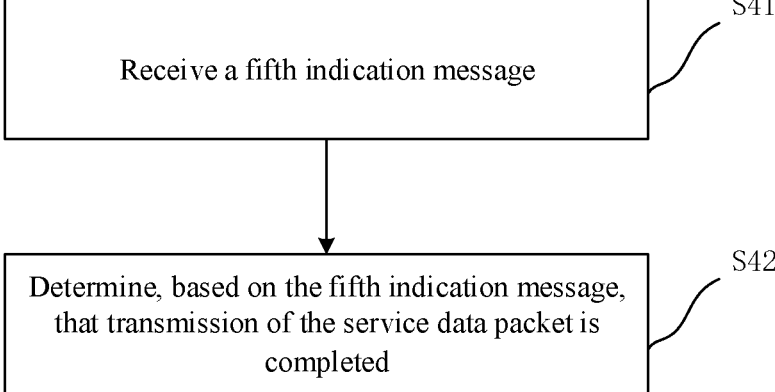
FIG. 5 is a flow diagram of another data transmission method according to an example of the disclosure.

FIG. 5 is a flow diagram of the data transmission method according to an example of the disclosure. As shown in FIG. 5, the data transmission method further includes steps S41 and S42.

Step S41 includes receiving a fifth indication message.

Step S42 includes determining, based on the fifth indication message, that transmission of the service data packet is completed.

In some examples of the disclosure, when sending the service data packet to the terminal, the network side may send the fifth indication message for a situation that the size of the transmitted service data packet is less than or equal to the reserved first transport block size. The fifth indication message is configured to indicate that there is no transmission-uncompleted service data packet. After receiving the fifth indication message, the terminal determines that transmission of the service data packet transmitted at the transmission occasion has been completed, and there is no transmission-uncompleted service data packet subsequently.

FIG. 6 is a flow diagram of the data transmission method according to an example of the disclosure. As shown in FIG. 6, the data transmission method further includes steps S51 and S52.

Step S51 includes receiving a sixth indication message.

Step S52 includes determining a size of a transmission-uncompleted service data packet based on the sixth indication message.

In some examples of the disclosure, the network side sends the service data packet to the terminal, and the terminal may determine the size of the transmission-uncompleted service data packet through the sixth indication message. After receiving the sixth indication message sent by the network side, the terminal determines that transmission of the service data packet is not completed.

In an example of the disclosure, different sequences may be configured for demodulation reference signals (DM-RSs) carried by the transmission. Whether there is the transmission-uncompleted service data packet is determined based on the different sequences of demodulation reference signals. A sequence of demodulation reference signals corresponding to a case where there is the transmission-uncompleted service data packet and a sequence of demodulation reference signals corresponding to a case where there is no transmission-uncompleted service data packet may be determined through pre-defined information. According to the received sequence of demodulation reference signals corresponding to the case where there is the transmission-uncompleted service data packet, the fourth indication message is determined, and the sixth indication message may further be determined, where the sixth indication message is configured to indicate that the transmission-uncompleted service data packet needs to be transmitted on an extra resource.

In another example of the disclosure, a first transmission resource may be determined among a transmitted preset resource, and whether there is the transmission-uncompleted service data packet is determined based on a scheduling request sent by the first transmission resource. The scheduling request is configured to request a resource for transmitting the transmission-uncompleted service data packet. In an example, there is the transmission-uncompleted service data packet, the scheduling request is sent on the first transmission resource, and the fourth indication message is determined according to the scheduling request. In an example, there is no transmission-uncompleted service data packet, the scheduling request is not sent on the first transmission resource, and it is further determined that transmission of the service data packet is completed; alternatively, the fifth indication message is determined, and it is determined, according to the fifth indication message, that transmission of the service data packet is completed.

In an example of the disclosure, it is determined that the fourth indication message and the sixth indication message are a first sequence, and the size of the transmission-uncompleted service data packet is greater than or equal to a first threshold. In other words, the determination of the fourth indication message and the sixth indication message being the first sequence implicitly indicates that a size of transmission-uncompleted service data packet following the service data packet transmitted at the transmission occasion is relatively large. In another example, it is determined that the fourth indication message and the sixth indication message are a second sequence, and the size of the transmission-uncompleted service data packet is less than or equal to the first threshold. In other words, the determination of the fourth indication message and the sixth indication message being the second sequence implicitly indicates that the size of the transmission-uncompleted service data packet following the service data packet transmitted at the transmission occasion is relatively small. In yet another example, it is determined that the fifth indication message is a third sequence, and there is no transmission-uncompleted service data packet. In other words, the determination of the fifth indication message being the third sequence implicitly indicates that transmission of the service data packet transmitted at the transmission occasion has been completed.

For example, three sequences of demodulation reference signals are configured for SPS transmission, including a sequence #1, a sequence #2 and a sequence #3. To facilitate descriptions, the first sequence may correspond to the sequence #1, the second sequence may correspond to the sequence #2, and the third sequence may correspond to the sequence #3. It may be determined based on a predetermined definition that: the sequence #1 indicates that there still has transmission-uncompleted service data packet following the service data packet transmitted at the transmission occasion, and the transmission-uncompleted service data packet is relatively large; the sequence #2 indicates that there still has transmission-uncompleted service data packet following the service data packet transmitted at the transmission occasion, and the transmission-uncompleted service data packet is relatively small; and the sequence #3 indicates that transmission of the service data packet transmitted at the transmission occasion has been completed.

Based on the same/similar conception, an example of the disclosure further provides a data transmission method.

FIG. 7 is a flow diagram of a data transmission method according to an example of the disclosure. As shown in FIG. 7, the data transmission method is performed by a network side and includes steps S61, S62 and S63.

Step S61 includes determining a first transport block size.

In the examples of the disclosure, a terminal may be a terminal applied to XR and a cloud-game scenario. Descriptions of the terminal are not limited by the disclosure. The terminal involved in the disclosure may further be other types of terminals, which are not repeated here.

In an example of the disclosure, a base station may transmit a service data packet based on a reserved resource of the first transport block size. The resource of the first transport block size may be less than a maximum transport block size. The first transport block size may be determined by a network-side device based on a size of a general transmission service data packet. For example, in the case that data transmitted between the network-side device and the terminal is relatively concentrated in a size of 600 kb, the base station may determine the first transport block size as 600 KB. This is an instance, not a limit to the disclosure.

Step S62 includes determining a relationship between a size of the service data packet and the first transport block size.

In an example of the disclosure, the network side determines the relationship between the size of the service data packet and the first transport block size. The relationship between the size of the service data packet and the first transport block size may include one of the following: the size of the service data packet is greater than the first transport block size; and the size of the service data packet is less than or equal to the first transport block size.

Step S63 includes transmitting the service data packet based on the first transport block size, and transmitting an indication message based on the relationship between the size of the service data packet and the first transport block size.

In an example of the disclosure, the network side transmits a data packet based on a configured/reserved resource of the first transport block size. In other words, the network side transmits part or all of service data packets based on the first transport block size at a transmission occasion. In an example, the network side determines that the size of the transmitted service data packet is greater than the first transport block size, so the network side transmits the service data packet of the first transport block size at the transmission occasion, and indicates through the indication message that there is a transmission-uncompleted service data packet subsequently. In an example, the size of the transmitted service data packet less than or equal to the first transport block size, so the network side transmits the service data packet at the transmission occasion, and may indicate, through the indication message, that transmission of the service data packet is completed. In an example, transmission of the service data packet may be completed based on the first transport block size, the indication message for indicating that transmission of the service data packet is completed may not be transmitted, and a receiving end may stop receiving after receiving the service data packet at the transmission occasion.

Through the data transmission method provided by the disclosure, the resource of the first transport block size is reserved, instead of reserving the resource according to possible maximum transport block size, and the indication message may be sent to inform whether there is transmission-uncompleted service data packet subsequently, so that waste of the reserved resource may be avoided.

Figure 8:
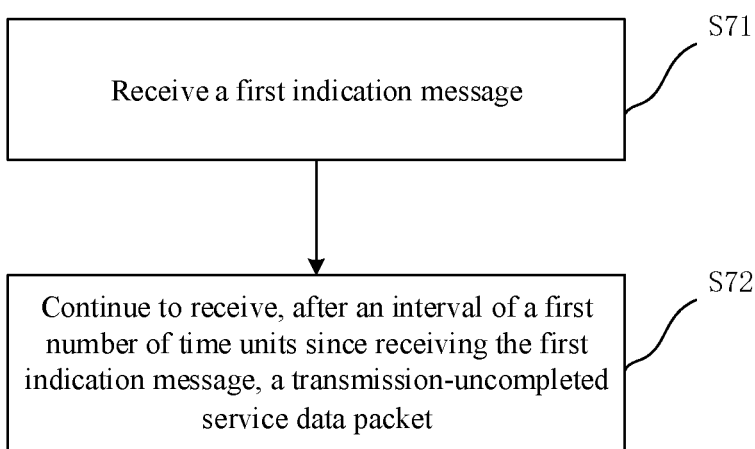
FIG. 8 is a flow diagram of another data transmission method according to an example of the disclosure.

FIG. 8 is a flow diagram of the data transmission method according to an example of the disclosure. As shown in FIG. 8, the data transmission method further includes steps S71 and S72.

Step S71 includes receiving a first indication message.

In an example of the disclosure, the first indication message is configured to indicate that there is a transmission-uncompleted service data packet.

Step S72 includes continuing to receive, after an interval of a first number of time units since receiving the first indication message, the transmission-uncompleted service data packet.

In an example of the disclosure, the indication message received by the network side is the first indication message. A sequence corresponding to the first indication message is determined, so that it is determined that there still has transmission-uncompleted service data packet in the terminal. The resource is reserved for transmitting, after an interval of a first number of time units since the first indication message is received, the transmission-uncompleted service data packet. The terminal continues to transmit, after an interval of the first number of time units since sending the first indication message, the transmission-uncompleted service data packet. The first number of time units may be X time units, where X is determined based on a predefined configuration. The network side continues to receive, after an interval of the first number of time units since receiving the first indication message, the transmission-uncompleted service data packet.

Figure 9:
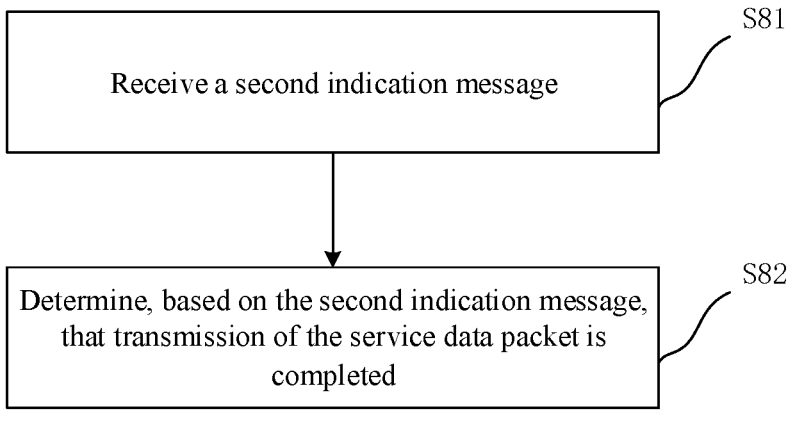
FIG. 9 is a flow diagram of yet another data transmission method according to an example of the disclosure.

FIG. 9 is a flow diagram of the data transmission method according to an example of the disclosure. As shown in FIG. 9, the data transmission method further includes steps S81 and S82.

Step S81 includes receiving a second indication message.

Step S82 includes determining, based on the second indication message, that transmission of the service data packet is completed.

In an example of the disclosure, the indication message received by the network side is the second indication message, a sequence corresponding to the second indication message is determined, so that it is determined that transmission of the service data packet transmitted by the terminal based on the transmission occasion is completed, and there is no transmission-uncompleted service data packet subsequently.

Figure 10:
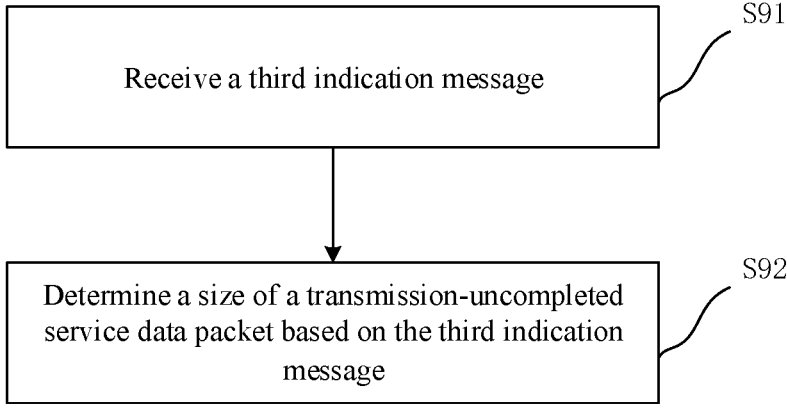
FIG. 10 is a flow diagram of another data transmission method according to an example of the disclosure.

FIG. 10 is a flow diagram of the data transmission method according to an example of the disclosure. As shown in FIG. 10, the data transmission method further includes steps S91 and S92.

Step S91 includes receiving a third indication message.

Step S92 includes determining a size of a transmission-uncompleted service data packet based on the third indication message.

In an example of the disclosure, the indication message received by the network side is the third indication message, a sequence corresponding to the third indication message is determined, so that the size of the transmission-uncompleted service data packet is determined.

In an example of the disclosure, different sequences may be configured for demodulation reference signals (DM-RSs) carried by the transmission. Whether there is the transmission-uncompleted service data packet is determined based on the different sequences of the demodulation reference signals. Through pre-defined information, the terminal may determine a sequence of demodulation reference signals corresponding to a case where there is the transmission-uncompleted service data packet, and determine a sequence of demodulation reference signals corresponding to a case where there is no transmission-uncompleted service data packet. According to the received sequence of demodulation reference signals corresponding to the case where there is the transmission-uncompleted service data packet, the first indication message is determined, and the third indication message may further be determined, where the third indication message is configured to indicate that the transmission-uncompleted service data packet needs to be transmitted on an extra resource.

In another example of the disclosure, a first transmission resource may be determined among a transmitted preset resource, and whether there is the transmission-uncompleted service data packet is determined based on a scheduling request sent by the first transmission resource. The scheduling request is configured to request a resource for transmitting the transmission-uncompleted service data packet. In an example, there is the transmission-uncompleted service data packet, the scheduling request is sent on the first transmission resource, and the first indication message is determined according to the scheduling request. In an example, there is no transmission-uncompleted service data packet, the scheduling request is not sent on the first transmission resource, and it is further determined that transmission of the service data packet is completed; alternatively, the second indication message is determined, and it is determined, according to the second indication message, that transmission of the service data packet is completed.

In an example of the disclosure, it is determined that the first indication message and the third indication message are a first sequence, and the size of the transmission-uncompleted service data packet is greater than or equal to a first threshold. In other words, the determination of the first indication message and the third indication message being the first sequence implicitly indicates that a size of transmission-uncompleted service data packet following the service data packet transmitted at the transmission occasion is relatively large. In another example, it is determined that the first indication message and the third indication message are a second sequence, and the size of the transmission-uncompleted service data packet is less than or equal to the first threshold. In other words, the determination of the first indication message and the third indication message being the second sequence implicitly indicates that the size of the transmission-uncompleted service data packet following the service data packet transmitted at the transmission occasion is relatively small. In yet another example, it is determined that the second indication message is a third sequence, and there is no transmission-uncompleted service data packet. In other words, the determination of the second indication message being the third sequence implicitly indicates that transmission of the service data packet transmitted at the transmission occasion has been completed.

For example, three sequences of demodulation reference signals are configured for SPS transmission, including a sequence #1, a sequence #2 and a sequence #3. To facilitate descriptions, the first sequence may correspond to the sequence #1, the second sequence may correspond to the sequence #2, and the third sequence may correspond to the sequence #3. It may be determined based on a predetermined definition that: the sequence #1 indicates that there still has transmission-uncompleted service data packet following the service data packet transmitted at the transmission occasion, and the transmission-uncompleted service data packet is relatively large; the sequence #2 indicates that there still has transmission-uncompleted service data packet following the service data packet transmitted at the transmission occasion, and the transmission-uncompleted service data packet is relatively small; and the sequence #3 indicates that transmission of the service data packet transmitted at the transmission occasion has been completed.

In an example of the disclosure, the indication message received by the network side is the first indication message, and a PDCCH is sent to the terminal.

In an example of the disclosure, the network side determines, when sending the service data packet to the terminal, the sent indication message based on a relationship between the size of the service data packet and the first transport block size. In an example, the size of the transmitted service data packet is greater than the reserved first transport block size, so the fourth indication message may be sent. The fourth indication message is configured to indicate that there is the transmission-uncompleted service data packet. In an example, the size of the transmitted service data packet is less than or equal to the reserved first transport block size, so a fifth indication message may be sent, where the fifth indication message is configured to indicate that there is no transmission-uncompleted service data packet. In an example, there is no transmission-uncompleted service data packet, and the indication message may not be sent.

In an example of the disclosure, transmission of the service data packet is not completed based on the first transport block size at the transmission occasion, and a sixth indication message may further be sent, where the sixth indication message is configured to indicate the size of the transmission-uncompleted service data packet. The size of the transmission-uncompleted service data packet of the network side is informed according to the sixth indication message.

In an example of the disclosure, different sequences may be configured for demodulation reference signals (DM-RSs) carried by the transmission. Whether there is the transmission-uncompleted service data packet is determined based on the different sequences of demodulation reference signals. A sequence of demodulation reference signals corresponding to a case where there is the transmission-uncompleted service data packet and a sequence of demodulation reference signals corresponding to a case where there is no transmission-uncompleted service data packet may be determined through pre-defined information. According to the received sequence of demodulation reference signals corresponding to the case where there is the transmission-uncompleted service data packet, the fourth indication message is determined, and the sixth indication message may further be determined, where the sixth indication message is configured to indicate that the transmission-uncompleted service data packet needs to be transmitted on an extra resource.

In another example of the disclosure, a first transmission resource may be determined among a transmitted preset resource, and whether there is the transmission-uncompleted service data packet is determined based on a scheduling request sent by the first transmission resource. The scheduling request is configured to request a resource for transmitting the transmission-uncompleted service data packet. In an example, there is the transmission-uncompleted service data packet, the scheduling request is sent on the first transmission resource, and the fourth indication message is determined according to the scheduling request. In an example, there is no transmission-uncompleted service data packet, the scheduling request is not sent on the first transmission resource, and it is further determined that transmission of the service data packet is completed; alternatively, the fifth indication message is determined, and it is determined, according to the fifth indication message, that transmission of the service data packet is completed.

In an example of the disclosure, it is determined that the fourth indication message and the sixth indication message are a first sequence, and the size of the transmission-uncompleted service data packet is greater than or equal to a first threshold. In other words, the determination of the fourth indication message and the sixth indication message being the first sequence implicitly indicates that a size of transmission-uncompleted service data packet following the service data packet transmitted at the transmission occasion is relatively large. In another example, it is determined that the fourth indication message and the sixth indication message are a second sequence, and the size of the transmission-uncompleted service data packet is less than or equal to the first threshold. In other words, the determination of the fourth indication message and the sixth indication message being the second sequence implicitly indicates that the size of the transmission-uncompleted service data packet following the service data packet transmitted at the transmission occasion is relatively small. In yet another example, it is determined that the fifth indication message is a third sequence, and there is no transmission-uncompleted service data packet. In other words, the determination of the fifth indication message being the third sequence implicitly indicates that transmission of the service data packet transmitted at the transmission occasion has been completed.

For example, three sequences of demodulation reference signals are configured for SPS transmission, including a sequence #1, a sequence #2 and a sequence #3. To facilitate descriptions, the first sequence may correspond to the sequence #1, the second sequence may correspond to the sequence #1, and the third sequence may correspond to the sequence #3. It may be determined based on a predetermined definition that: the sequence #1 indicates that there still has transmission-uncompleted service data packet following the service data packet transmitted at the transmission occasion, and the transmission-uncompleted service data packet is relatively large; the sequence #2 indicates that there still has transmission-uncompleted service data packet following the service data packet transmitted at the transmission occasion, and the transmission-uncompleted service data packet is relatively small; and the sequence #3 indicates that transmission of the service data packet transmitted at the transmission occasion has been completed.

In an example, the network side sends the fourth indication message to inform the terminal that there still has transmission-uncompleted service data packet, and the network side continues to transmit, after an interval of a first number of time units since sending the fourth indication message, the transmission-uncompleted service data packet.

In an example of the disclosure, the network side transmits the service data packet to the terminal but does not complete the transmission of the service data packet at the transmission occasion, so the network side sends the fourth indication message to the terminal, and reserves resources for transmitting the transmission-uncompleted service data packet. The reserved resources are resources reserved for transmitting, after an interval of a first number of time units since the fourth indication message is sent, the transmission-uncompleted service data packet. The terminal continues to receive, after the interval of the first number of time units since receiving the fourth indication message, the transmission-uncompleted service data packet. The first number of time units may be X time units, where X is determined based on a predefined configuration.

Based on the same conception, there is further provided a data transmission apparatus according to an example of the disclosure.

It may be understood that to achieve above functions, the data transmission apparatus provided by an example of the disclosure includes at least one of a corresponding hardware structure or a corresponding software module executing the functions. With reference to units and algorithm steps of the examples disclosed in the disclosure, an example of the disclosure may be implemented in a form of hardware or combining the hardware with computer software. Whether a function is executed as hardware or in a mode of the computer software driving the hardware depends on the application and design constraints of the technical solution. Those skilled in the art may use different methods to implement the described functions for each application, but such implementation should not be considered out of the scope of the technical solution of an example of the disclosure.

Figure 11:
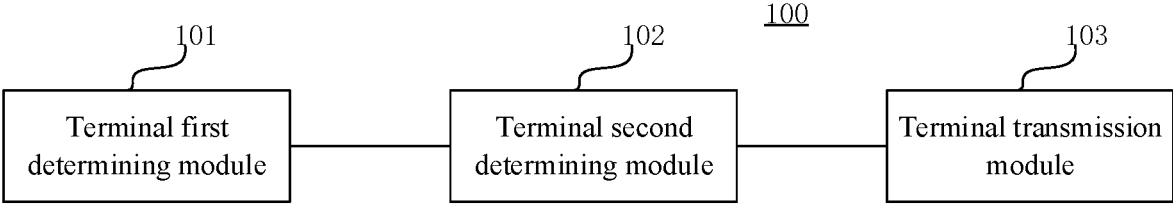
FIG. 11 is a block diagram of a data transmission apparatus according to an example of the disclosure.

FIG. 11 is a block diagram of a data transmission apparatus 100 according to an example of the disclosure. Referring to FIG. 11, the apparatus includes a terminal first determining module 101, a terminal second determining module 102 and a terminal transmission module 103.

The terminal first determining module 101 is configured to determine a first transport block size. The terminal second determining module 102 is configured to determine a relationship between a size of a service data packet and the first transport block size. The terminal transmission module 103 is configured to transmit the service data packet based on the first transport block size, and to transmit an indication message based on the relationship between the size of the service data packet and the first transport block size.

In an example of the disclosure, the terminal transmission module 103 is configured to determine that the size of the service data packet is greater than the first transport block size, and send a first indication message, where the first indication message is configured to indicate that there is a transmission-uncompleted service data packet.

In an example of the disclosure, the terminal transmission module 103 is configured to determine that the size of the service data packet is less than or equal to the first transport block size, and send a second indication message, where the second indication message is configured to indicate that there is no transmission-uncompleted service data packet.

In an example of the disclosure, the terminal transmission module 103 is further configured to send a third indication message, where the third indication message is configured to indicate a size of the transmission-uncompleted service data packet.

In an example of the disclosure, the first indication message, the second indication message and the third indication message are determined based on sequences of demodulation reference signals. The sequences of the demodulation reference signals are configured to indicate at least one of: whether there is the transmission-uncompleted service data packet; or the size of the transmission-uncompleted service data packet.

In an example of the disclosure, the first indication message and the second indication message are determined based on a scheduling request on a first transmission resource.

In an example of the disclosure, the first indication message and the third indication message are a first sequence, and the size of the transmission-uncompleted service data packet is greater than or equal to a first threshold.

In an example of the disclosure, the first indication message and the third indication message are a second sequence, and the size of the transmission-uncompleted service data packet is less than or equal to the first threshold.

In an example of the disclosure, the terminal transmission module 103 is further configured to send the first indication message and determine to detect a downlink control channel, where the downlink control channel is configured to schedule the transmission-uncompleted service data packet.

In an example of the disclosure, after detecting the downlink control channel, the terminal transmission module 103 is further configured to receive the downlink control channel, and transmit the transmission-uncompleted service data packet based on the downlink control channel.

In an example of the disclosure, the terminal transmission module 103 is further configured to continue to transmit, after an interval of a first number of time units since sending the first indication message, the transmission-uncompleted service data packet.

In an example of the disclosure, the terminal transmission module 103 is further configured to receive a fourth indication message, and determine, based on the fourth indication message, to continue to receive the transmission-uncompleted service data packet.

In an example of the disclosure, the terminal transmission module 103 is further configured to receive a fifth indication message, and determine, based on the fifth indication message, that transmission of the service data packet is completed.

In an example of the disclosure, the terminal transmission module 103 is further configured to receive a sixth indication message, and determine a size of the transmission-uncompleted service data packet based on the sixth indication message.

Figure 12:
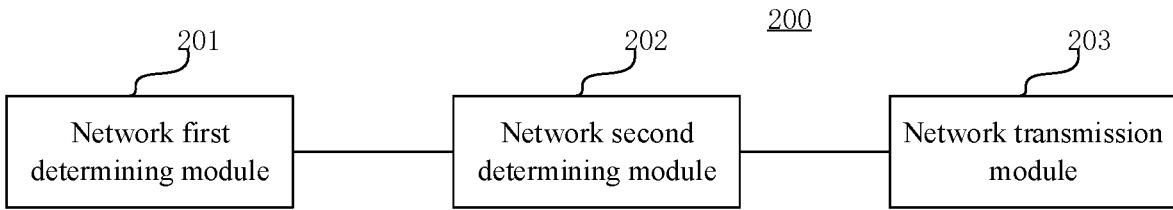
FIG. 12 is a block diagram of another data transmission apparatus according to an example of the disclosure.

FIG. 12 is a block diagram of a data transmission apparatus 200 according to an example of the disclosure. Referring to FIG. 12, the apparatus is applied to a network side and includes a network first determining module 201, a network second determining module 202 and a network transmission module 203.

The network first determining module 201 is configured to determine a first transport block size. The network second determining module 202 is configured to determine a relationship between a size of a service data packet and the first transport block size. The network transmission module 203 is configured to transmit the service data packet based on the first transport block size, and transmit an indication message based on the relationship between the size of the service data packet and the first transport block size.

In an example of the disclosure, the network transmission module 203 is configured to receive a first indication message, where the first indication message is configured to indicate that there is a transmission-uncompleted service data packet. The network transmission module 203 continues to receive, after an interval of a first number of time units since receiving the first indication message, the transmission-uncompleted service data packet.

In an example of the disclosure, the network transmission module 203 is configured to receive a second indication message, and determine, based on the second indication message, that transmission of the service data packet is completed.

In an example of the disclosure, the network transmission module 203 is further configured to receive a third indication message, and determine a size of the transmission-uncompleted service data packet based on the third indication message.

In an example of the disclosure, the network transmission module 203 is further configured to receive the first indication message and determine to send a downlink control channel, where the downlink control channel is configured to schedule the transmission-uncompleted service data packet.

In an example of the disclosure, the network transmission module 203 is further configured to determine that the size of the service data packet is greater than the first transport block size, and send a fourth indication message, where the fourth indication message is configured to indicate that there is the transmission-uncompleted service data packet.

In an example of the disclosure, the network transmission module 203 is further configured to determine that the size of the service data packet is less than or equal to the first transport block size, and send a fifth indication message, where the fifth indication message is configured to indicate that there is no transmission-uncompleted service data packet.

In an example of the disclosure, the network transmission module 203 is further configured to send a sixth indication message, where the sixth indication message is configured to indicate a size of the transmission-uncompleted service data packet.

In an example of the disclosure, the fourth indication message, the fifth indication message and the sixth indication message are determined based on sequences of demodulation reference signals. The sequences of the demodulation reference signals are configured to indicate at least one of:

whether there is the transmission-uncompleted service data packet; or the size of the transmission-uncompleted service data packet.

In an example of the disclosure, the fourth indication message and the fifth indication message are determined based on a scheduling request on a first transmission resource.

In an example of the disclosure, the fourth indication message and the sixth indication message are a first sequence, and the size of the transmission-uncompleted service data packet is greater than or equal to a first threshold.

In an example of the disclosure, the fourth indication message and the sixth indication message are a second sequence, and the size of the transmission-uncompleted service data packet is less than or equal to the first threshold.

In an example of the disclosure, the network transmission module 203 is further configured to continue to transmit, after an interval of a first number of time units since sending the fourth indication message, the transmission-uncompleted service data packet.

With respect to the apparatus in the above examples, the manner in which each module performs operation has been described in detail in examples related to the method and will not be illustrated in detail here.

Figure 13:
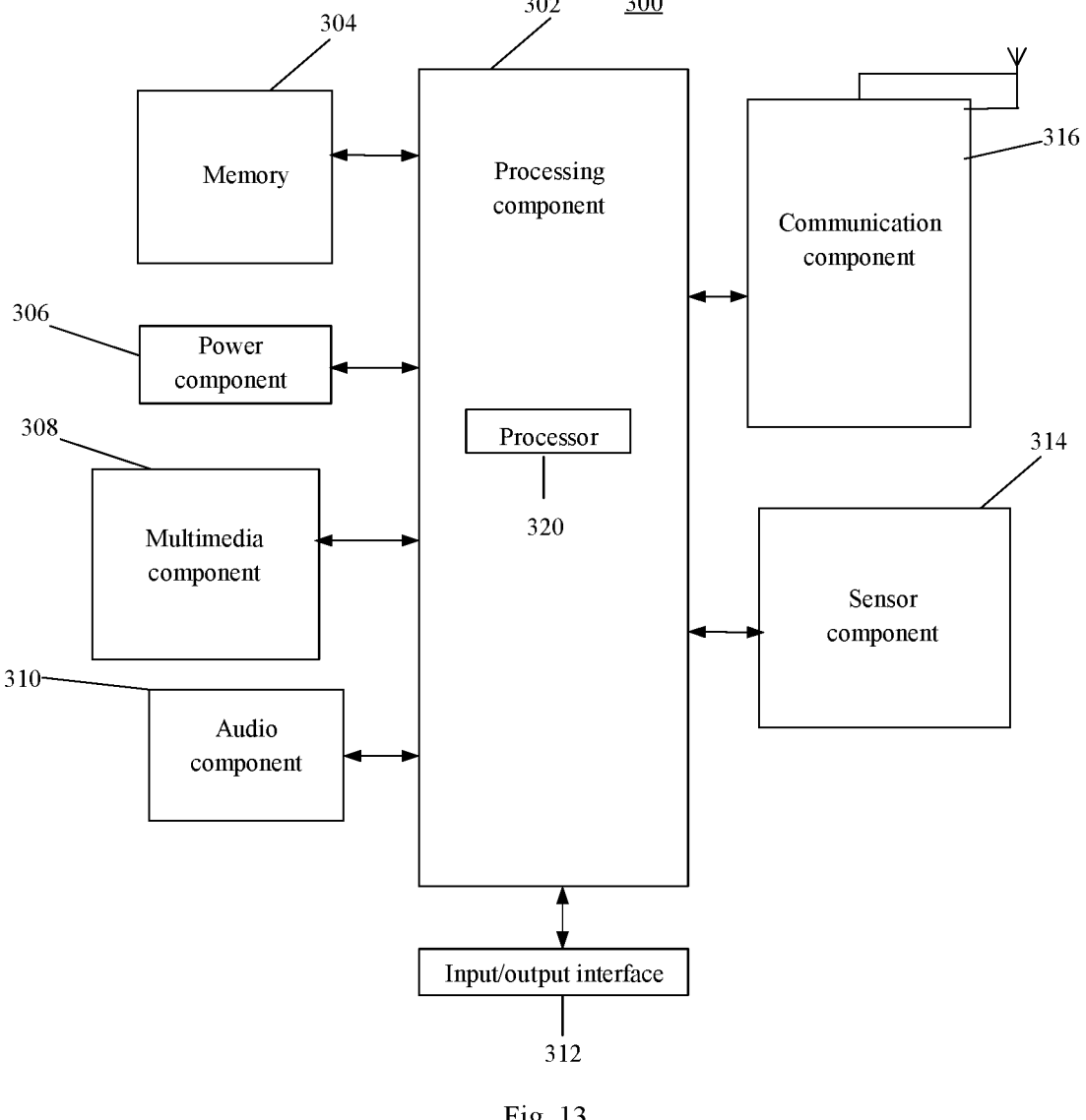
FIG. 13 is a block diagram of a data transmission apparatus according to an example of the disclosure.

FIG. 13 is a block diagram of a data transmission apparatus 300 according to an example of the disclosure. For example, the apparatus 300 may be a mobile phone, a computer, a digital broadcasting terminal, a messaging device, a game console, a tablet device, a medical device, a fitness device, a personal digital assistant, etc.

Referring to FIG. 13, the apparatus 300 may include one or more of a processing component 302, a memory 304, a power component 306, a multimedia component 308, an audio component 310, an input/output (I/O) interface 312, a sensor component 314, and a communication component 316.

The processing component 302 typically controls an overall operation of the apparatus 300, such as an operation associated with display, telephone call, data communication, camera operation, and recording operation. The processing component 302 may include one or more processors 320 to execute instructions to complete all or part of the steps of the above methods. In addition, the processing component 302 may include one or more modules to facilitate interactions between the processing component 302 and other components. For example, the processing component 302 may include a multimedia module to facilitate the interaction between the multimedia component 308 and the processing component 302.

The memory 304 is configured to store various types of data to support the operation on the apparatus 300. Examples of such data include instructions for any application program or method operated on the apparatus 300, contact data, phone book data, messages, pictures, videos, etc. The memory 304 may be implemented by any type of volatile or non-volatile storage device or a combination of them, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disc.

The power component 306 provides power to various components of the apparatus 300. The power component 306 may include a power management system, one or more power supplies, and other components associated with generating, managing, and distributing power for the apparatus 300.

The multimedia component 308 includes a screen providing an output interface between the apparatus 300 and a user. In some examples, the screen may include a liquid crystal display (LCD) and a touch panel (TP). In the case that the screen includes the touch panel, the screen may be implemented as a touch screen to receive input signals from the user. The touch panel includes one or more touch sensors to sense touch, slide, and gestures on the touch panel. The touch sensor may not only sense boundaries of a touch or slide action, but also detect the duration and pressure associated with the touch or slide action. In some examples, the multimedia component 308 includes at least one of a front camera or a rear camera. When the apparatus 300 is in an operation mode, such as a shooting mode or a video mode, at least one of the front camera or the rear camera may receive external multimedia data. Each front camera and each rear camera may be a fixed optical lens system or have focal length and optical zoom capability.

The audio component 310 is configured to output and/or input audio signals. For example, the audio component 310 includes a microphone (MIC) that is configured to receive external audio signals when the apparatus 300 is in the operation mode, such as a call mode, a recording mode, and a speech recognition mode. The received audio signals may be further stored in the memory 304 or sent via the communication component 316. In some examples, the audio component 310 also includes a speaker for outputting the audio signals.

The I/O interface 312 provides an interface between the processing component 302 and a peripheral interface module. The above peripheral interface module may be a keyboard, a click wheel, buttons, etc. These buttons may include, but are not limited to, a home button, a volume button, a start button, and a lock button.

The sensor component 314 includes one or more sensors configured to provide a status assessment of various aspects of the apparatus 300. For example, the sensor component 314 may detect an on/off state of the apparatus 300, and relative positioning of the components, for example, the component is a display and a keypad of the apparatus 300, and the sensor component 314 may also detect the change in the position of the apparatus 300 or one of the components of the apparatus 300, presence or absence of contact between the user and the apparatus 300, an orientation or acceleration/deceleration of the apparatus 300 and a temperature change of the apparatus 300. The sensor component 314 may include a proximity sensor configured to detect presence of nearby objects without any physical contact. The sensor component 314 may also include an optical sensor, such as a CMOS or CCD image sensor, configured to be used in imaging applications. In some examples, the sensor component 314 may also include an acceleration sensor, a gyroscope sensor, a magnetic sensor, a pressure sensor or a temperature sensor.

The communication component 316 is configured to facilitate wired or wireless communication between the apparatus 300 and other devices. The apparatus 300 may access a wireless network based on a communication standard, such as WiFi, 2G or 3G, or a combination of them. In an example, the communication component 316 receives broadcast signals or broadcast-related information from an external broadcast management system via a broadcast channel In an example, the communication component 316 also includes a near-field communication (NFC) module to promote short-range communication. For example, the NFC module may be implemented based on a radio frequency identification (RFID) technology, an infrared data association (IrDA) technology, an ultra wideband (UWB) technology, a Bluetooth (BT) technology and other technologies.

In an example, the apparatus 300 may be implemented by one or more of a application specific integrated circuit (ASIC), a digital signal processor (DSP), a digital signal processing device (DSPD), a programmable logic device (PLD), a field programmable gate array (FPGA), a controller, a microcontroller, a microprocessor, or other electronic component, for performing the above methods.

In an example, a non-transitory computer readable storage medium including instructions is also provided, such as a memory 304 including the instructions, and the above instructions may be executed by the processor 320 of the apparatus 300 to complete the above method. For example, the non-transitory computer readable storage medium may be an ROM, a random access memory (RAM), a CD-ROM, a magnetic tape, a floppy disk, an optical data storage device, etc.

Figure 14:
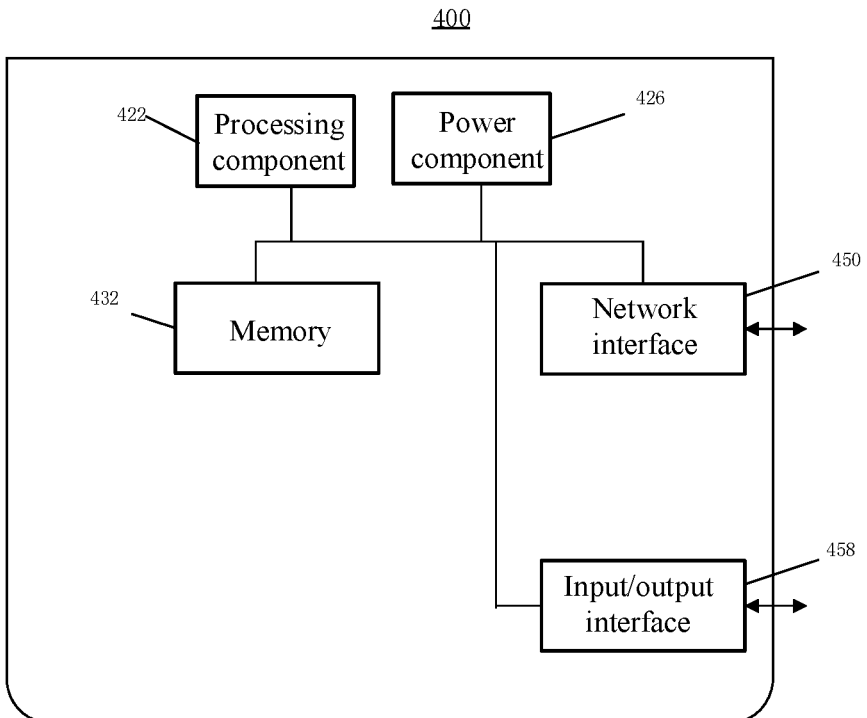
FIG. 14 is a block diagram of another data transmission apparatus according to an example of the disclosure.

FIG. 14 is a block diagram of a data transmission apparatus 400 according to an example of the disclosure. For example, the apparatus 400 may be provided as a server. Referring to FIG. 14, the apparatus 400 includes: a processing component 422, which further includes one or more processors; and memory resources represented by the memory 432, for storing instructions that may be executed by the processing component 422, such as application programs. The application programs stored in the memory 432 may include one or more modules each corresponding to a set of instructions. In addition, the processing component 422 is configured to execute the instructions to perform the above data transmission methods.

The apparatus 400 may also include a power component 426 configured to perform power management for the apparatus 400, a wired or wireless network interface 450 configured to connect the apparatus 400 to a network, and an input/output (I/O) interface 458. The apparatus 400 may operate an operating system stored in the memory 432, such as Windows Server™, Mac OS X™, Unix™, Linux™, FreeBSD™ or similar.

The other non-limiting examples are as following.

According to a first aspect of examples of the disclosure, there is provided a data transmission method performed by a terminal. The data transmission method includes: determining a first transport block size; determining a relationship between a size of a service data packet and the first transport block size; and transmitting the service data packet based on the first transport block size, and transmitting an indication message based on the relationship between the size of the service data packet and the first transport block size.

In an example, transmitting the indication message based on the relationship between the size of the service data packet and the first transport block includes: the size of the service data packet being greater than the first transport block size, and sending a first indication message, where the first indication message is configured to indicate that there is a transmission-uncompleted service data packet.

In an example, transmitting the indication message based on the relationship between the size of the service data packet and the first transport block includes: the size of the service data packet being less than or equal to the first transport block size, and sending a second indication message, where the second indication message is configured to indicate that there is no transmission-uncompleted service data packet.

In an example, the method further includes: sending a third indication message, where the third indication message is configured to indicate a size of the transmission-uncompleted service data packet.

In an example, the first indication message, the second indication message and the third indication message are determined based on a sequence of demodulation reference signals. The sequence of the demodulation reference signals is configured to indicate at least one of: whether there is a transmission-uncompleted service data packet; or a size of a transmission-uncompleted service data packet.

In an example, the first indication message and the second indication message are determined based on a scheduling request on a first transmission resource.

In an example, the first indication message and the third indication message are a first sequence, and the size of the transmission-uncompleted service data packet is greater than or equal to a first threshold.

In an example, the first indication message and the third indication message are a second sequence, and the size of the transmission-uncompleted service data packet is less than or equal to a first threshold.

In an example, the method further includes: sending the first indication message and determining to detect a downlink control channel, where the downlink control channel is configured to schedule the transmission-uncompleted service data packet.

In an example, after detecting the downlink control channel, the method further includes: receiving the downlink control channel; and transmitting the transmission-uncompleted service data packet based on the downlink control channel.

In an example, the method further includes: continuing to transmit, after an interval of a first number of time units since sending the first indication message, the transmission-uncompleted service data packet.

In an example, transmitting the indication message includes: receiving a fourth indication message; and determining, based on the fourth indication message, to continue to receive the transmission-uncompleted service data packet.

In an example, transmitting the indication message includes: receiving a fifth indication message; and determining, based on the fifth indication message, that transmission of the service data packet is completed.

In an example, transmitting the indication message includes: receiving a sixth indication message; and determining a size of the transmission-uncompleted service data packet based on the sixth indication message.

According to a second aspect of the examples of the disclosure, there is provided a data transmission method performed by a network side. The method includes: determining a first transport block size; determining a relationship between a size of a service data packet and the first transport block size; and transmitting the service data packet based on the first transport block size, and transmitting an indication message based on the relationship between the size of the service data packet and the first transport block size.

In an example, transmitting the indication message includes: receiving a first indication message, where the first indication message is configured to indicate that there is a transmission-uncompleted service data packet; and continuing to receive, after an interval of a first number of time units since receiving the first indication message, the transmission-uncompleted service data packet.

In an example, transmitting the indication message includes: receiving a second indication message; and determining, based on the second indication message, that transmission of the service data packet is completed.

In an example, transmitting the indication message includes: receiving a third indication message; and determining a size of the transmission-uncompleted service data packet based on the third indication message.

In an example, receiving the first indication message further includes: receiving the first indication message and determining to send a downlink control channel, where the downlink control channel is configured to schedule the transmission-uncompleted service data packet.

In an example, transmitting the indication message based on the relationship between the size of the service data packet and the first transport block size includes: the size of the service data packet being greater than the first transport block size and sending a fourth indication message, where the fourth indication message is configured to indicate that there is a transmission-uncompleted service data packet.

In an example, transmitting the indication message based on the relationship between the size of the service data packet and the first transport block size includes: the size of the service data packet being less than or equal to the first transport block size and sending a fifth indication message, where the fifth indication message is configured to indicate that there is no transmission-uncompleted service data packet.

In an example, the method further includes: sending a sixth indication message, where the sixth indication message is configured to indicate a size of a transmission-uncompleted service data packet.

In an example, the fourth indication message, the fifth indication message and the sixth indication message are determined based on a sequence of demodulation reference signals. The sequence of the demodulation reference signals is configured to indicate at least one of: whether there is the transmission-uncompleted service data packet; or the size of the transmission-uncompleted service data packet.

In an example, the fourth indication message and the fifth indication message are determined based on a scheduling request on a first transmission resource.

In an example, the fourth indication message and the sixth indication message are a first sequence, and the size of the transmission-uncompleted service data packet is greater than or equal to a first threshold.

In an example, the fourth indication message and the sixth indication message are a second sequence, and the size of the transmission-uncompleted service data packet is less than or equal to a first threshold.

In an example, the method further includes: continuing to transmit, after an interval of a first number of time units since sending the fourth indication message, the transmission-uncompleted service data packet.

According to a third aspect of the examples of the disclosure, there is provided a data transmission apparatus applied to a terminal. The data transmission apparatus includes: a terminal first determining module, configured to determine a first transport block size; a terminal second determining module, configured to determine a relationship between a size of a service data packet and the first transport block size; and a terminal transmission module, configured to transmit the service data packet based on the first transport block size, and to transmit an indication message based on the relationship between the size of the service data packet and the first transport block size.

In an example, the terminal transmission module is configured to: determine that the size of the service data packet is greater than the first transport block size, and send a first indication message, where the first indication message is configured to indicate that there is a transmission-uncompleted service data packet.

In an example, the terminal transmission module is configured to: determine that the size of the service data packet is less than or equal to the first transport block size, and send a second indication message, where the second indication message is configured to indicate that there is no transmission-uncompleted service data packet.

In an example, the terminal transmission module is further configured to: send a third indication message, where the third indication message is configured to indicate a size of the transmission-uncompleted service data packet.

In an example, the first indication message, the second indication message and the third indication message are determined based on a sequence of demodulation reference signals. The sequence of the demodulation reference signals is configured to indicate at least one of: whether there is the transmission-uncompleted service data packet; or a size of the transmission-uncompleted service data packet.

In an example, the first indication message and the second indication message are determined based on a scheduling request on a first transmission resource.

In an example, the first indication message and the third indication message are a first sequence, and the size of the transmission-uncompleted service data packet is greater than or equal to a first threshold.

In an example, the first indication message and the third indication message are a second sequence, and the size of the transmission-uncompleted service data packet is less than or equal to a first threshold.

In an example, the apparatus is further configured to: send the first indication message and determine to detect a downlink control channel, where the downlink control channel is configured to schedule the transmission-uncompleted service data packet.

In an example, after detecting the downlink control channel, the apparatus is further configured to: receive the downlink control channel; and transmit the transmission-uncompleted service data packet based on the downlink control channel.

In an example, the apparatus is further configured to: continue to transmit, after an interval of a first number of time units since sending the first indication message, the transmission-uncompleted service data packet.

In an example, the terminal transmission module is further configured to: receive a fourth indication message; and determine, based on the fourth indication message, to continue to receive the transmission-uncompleted service data packet.

In an example, the terminal transmission module is further configured to: receive a fifth indication message; and determine, based on the fifth indication message, that transmission of the service data packet is completed.

In an example, the terminal transmission module is further configured to: receive a sixth indication message; and determine a size of a transmission-uncompleted service data packet based on the sixth indication message.

According to a fourth aspect of the examples of the disclosure, there is provided a data transmission apparatus applied to a network side. The data transmission apparatus includes: a network first determining module, configured to determine a first transport block size; a network second determining module, configured to determine a relationship between a size of a service data packet and the first transport block size; and a network transmission module, configured to transmit the service data packet based on the first transport block size, and to transmit an indication message based on the relationship between the size of the service data packet and the first transport block size.

In an example, the network transmission module is configured to: receive a first indication message, where the first indication message is configured to indicate that there is a transmission-uncompleted service data packet; and continue to receive, after an interval of a first number of time units since receiving the first indication message, the transmission-uncompleted service data packet.

In an example, the network transmission module is configured to: receive a second indication message; and determine, based on the second indication message, that transmission of the service data packet is completed.

In an example, the network transmission module is further configured to: receive a third indication message; and determine a size of the transmission-uncompleted service data packet based on the third indication message.

In an example, the network transmission module is further configured to: receive the first indication message and determine to send a downlink control channel, where the downlink control channel is configured to schedule the transmission-uncompleted service data packet.

In an example, the network transmission module is further configured to: determine that the size of the service data packet is greater than the first transport block size, and send a fourth indication message, where the fourth indication message is configured to indicate that there is a transmission-uncompleted service data packet.

In an example, the network transmission module is further configured to: determine that the size of the service data packet is less than or equal to the first transport block size, and send a fifth indication message, where the fifth indication message is configured to indicate that there is no transmission-uncompleted service data packet.

In an example, the network transmission module is further configured to: send a sixth indication message, where the sixth indication message is configured to indicate a size of the transmission-uncompleted service data packet.

In an example, the fourth indication message, the fifth indication message and the sixth indication message are determined based on a sequence of demodulation reference signals. The sequence of the demodulation reference signals is configured to indicate at least one of: whether there is the transmission-uncompleted service data packet; or a size of the transmission-uncompleted service data packet.

In an example, the fourth indication message and the fifth indication message are determined based on a scheduling request on a first transmission resource.

In an example, the fourth indication message and the sixth indication message are a first sequence, and the size of the transmission-uncompleted service data packet is greater than or equal to a first threshold.

In an example, the fourth indication message and the sixth indication message are a second sequence, and the size of the transmission-uncompleted service data packet is less than or equal to a first threshold.

In an example, the network transmission module is further configured to: continue to transmit, after an interval of a first number of time units since sending the fourth indication message, the transmission-uncompleted service data packet.

According to a fifth aspect of the examples of the disclosure, there is provided a data transmission apparatus, including: a processor; and a memory configured to store a processor-executable-instruction, where the processor is configured to execute the data transmission method of the first aspect or in any one example in the first aspect or execute the data transmission method of the second aspect or in any one example in the second aspect.

According to a sixth aspect of the examples of the disclosure, there is provided a non-transitory computer readable storage medium. When an instruction in the storage medium is executed by a processor of a mobile terminal, the mobile terminal is caused to execute the data transmission method of the first aspect or in any one example in the first aspect or the mobile terminal is caused to execute the data transmission method of the second aspect or in any one example in the second aspect.

Technical solutions provided by the examples of the disclosure may possess following beneficial effects: by configuring the first transport block size of the preset size, transmitting the service data packet based on the first transport block size, and indicating, through the indication message, whether transmission of the service data packet is completed or not, the data transmission method provided in the disclosure does not need to reserve the maximum resource for transmitting the data packet, effectively avoiding the waste of the reserved resource.

It may be further understood that "a plurality of" in the disclosure means two or more, and other quantifiers are similar. "And/or" describes an association relationship of associated objects, and indicates that there may be three kinds of relations, for example, A and/or B may represent: A exists alone, A and B exist simultaneously, and B exists alone. A character "/" generally indicates that the context-associated object is an "or" relationship. The singular forms of "a", "said" and "the" are also intended to include a plurality of forms, unless the context clearly indicates otherwise.

It may be further understood that terms "first", "second", etc. are used to describe a variety of information, but that information should not be limited to these terms. These terms are used to distinguish the same type of information from one another and do not indicate a particular order or a degree of importance. In fact, expressions such as "first", "second", etc. may be completely interchangeable. For example, first information may also be called second information, and similarly the second information may also be called the first information in a case of not departing from the scope of the disclosure.

It may be further understood that in the examples of the disclosure, although operations are described in a particular order in the accompanying drawings, they should not be understood as demanding that the operations are executed in a particular or serial order as shown, or demanding that all the shown operations are executed to obtain a desired result. In a specific environment, multitasking and parallel processing may be beneficial.

After considering the specification and the practice of the invention disclosed here, those skilled in the art will easily think of other solutions of the disclosure. The disclosure is intended to cover any variation, use or adaptation changes of the disclosure, these variation, use or adaptation changes follow general principles of the disclosure and include common knowledge or customary technical means in the technical field not disclosed in the disclosure. The specification and examples are regarded as examples, and the true scope and spirit of the disclosure are indicated by the claims below.

It should be understood that the disclosure is not limited to a precise structure already described above and shown in the accompanying drawings, and various modifications and changes may be made without departing from the scope of the disclosure. The scope of the disclosure is limited by the appended claims.

What is claimed is:

1. A data transmission method, performed by a terminal, the data transmission method comprising:

determining a first transport block size;

determining a relationship between a size of a service data packet of the terminal and the first transport block size; and transmitting the service data packet of the terminal based on the first transport block size, and transmitting an indication message based on the relationship between the size of the service data packet of the terminal and the first transport block size;

wherein transmitting the indication message based on the relationship between the size of the service data packet of the terminal and the first transport block size comprises:

the size of the service data packet of the terminal being greater than the first transport block size, and sending a first indication message, wherein the first indication message is configured to indicate that there is a transmission-uncompleted service data packet of the terminal; and wherein the data transmission method further comprises:

continuing to transmit, after an interval of a first number of time units since sending the first indication message, the transmission-uncompleted service data packet of the terminal.

2. The data transmission method according to claim 1, wherein transmitting the indication message based on the relationship between the size of the service data packet of the terminal and the first transport block size further comprises:

the size of the service data packet of the terminal being less than or equal to the first transport block size, and sending a second indication message, wherein the second indication message is configured to indicate that there is no transmission-uncompleted service data packet of the terminal;

wherein the data transmission method further comprises sending a third indication message, wherein the third indication message is configured to indicate a size of the transmission-uncompleted service data packet of the terminal.

3. The data transmission method according to claim 2, wherein the first indication message, the second indication message and the third indication message are determined based on a sequence of demodulation reference signals, wherein the sequence of the demodulation reference signals is configured to indicate at least one of the following: whether there is the transmission-uncompleted service data packet of the terminal, or the size of the transmission-uncompleted service data packet of the terminal.

4. The data transmission method according to claim 2, wherein the first indication message and the second indication message are determined based on a scheduling request on a first transmission resource.

5. The data transmission method according to claim 3, wherein the first indication message and the third indication message are a first sequence, and the size of the transmission-uncompleted service data packet of the terminal is greater than or equal to a first threshold; or the first indication message and the third indication message are a second sequence, and the size of the transmission-uncompleted service data packet of the terminal is less than or equal to a first threshold.

6. The data transmission method according to claim 1, further comprising:

sending the first indication message and determining to detect a downlink control channel, wherein the downlink control channel is configured to schedule the transmission-uncompleted service data packet of the terminal.

7. The data transmission method according to claim 6, wherein after detecting the downlink control channel, the data transmission method further comprises:

receiving the downlink control channel; and transmitting the transmission-uncompleted service data packet of the terminal based on the downlink control channel.

8. The data transmission method according to claim 1, wherein transmitting the indication message comprises at least one of the following:

receiving a fourth indication message, and determining, based on the fourth indication message, to continue to receive a transmission-uncompleted service data packet of a network device;

receiving a fifth indication message, and determining, based on the fifth indication message, that transmission of a service data packet of a network device is completed; or receiving a sixth indication message, and determining a size of a transmission-uncompleted service data packet of a network device based on the sixth indication message.

9. A data transmission method performed by a network device, the data transmission method comprising:

determining a first transport block size;

determining a relationship between a size of a service data packet of the network device and the first transport block size; and transmitting the service data packet of the network device based on the first transport block size, and transmitting an indication message based on the relationship between the size of the service data packet of the network device and the first transport block size;

wherein transmitting the indication message based on the relationship between the size of the service data packet of the network device and the first transport block size comprises:

the size of the service data packet of the network device being greater than the first transport block size and sending a fourth indication message, wherein the fourth indication message is configured to indicate that there is a transmission-uncompleted service data packet of the network device; and wherein the data transmission method further comprises:

continuing to transmit, after an interval of a first number of time units since sending the fourth indication message, the transmission-uncompleted service data packet of the network device.

10. The data transmission method according to claim 9, wherein transmitting the indication message comprises at least one of the following:

receiving a first indication message, wherein the first indication message is configured to indicate that there is a transmission-uncompleted service data packet of a terminal, and continuing to receive, after an interval of a first number of time units since receiving the first indication message, the transmission-uncompleted service data packet of the terminal;

receiving a second indication message, and determining, based on the second indication message, that transmission of a service data packet of a terminal is completed; or receiving a third indication message, and determining a size of a transmission-uncompleted service data packet of a terminal based on the third indication message.

11. The data transmission method according to claim 10, wherein receiving the first indication message further comprises:

receiving the first indication message and determining to send a downlink control channel, wherein the downlink control channel is configured to schedule the transmission-uncompleted service data packet of the terminal.

12. The data transmission method according to claim 9, wherein transmitting the indication message based on the relationship between the size of the service data packet of the network device and the first transport block size further comprises:

the size of the service data packet of the network device being less than or equal to the first transport block size and sending a fifth indication message, wherein the fifth indication message is configured to indicate that there is no transmission-uncompleted service data packet of the network device;

wherein the data transmission method further comprises sending a sixth indication message, wherein the sixth indication message is configured to indicate a size of the transmission-uncompleted service data packet of the network device.

13. The data transmission method according to claim 12, wherein the fourth indication message, the fifth indication message and the sixth indication message are determined based on a sequence of demodulation reference signals, wherein the sequence of the demodulation reference signals is configured to indicate at least one of the following: whether there is the transmission-uncompleted service data packet of the network device; or the size of the transmission-uncompleted service data packet of the network device.

14. The data transmission method according to claim 12, wherein the fourth indication message and the fifth indication message are determined based on a scheduling request on a first transmission resource.

15. The data transmission method according to claim 13, wherein the fourth indication message and the sixth indication message are a first sequence, and the size of the transmission-uncompleted service data packet of the network device is greater than or equal to a first threshold; or the fourth indication message and the sixth indication message are a second sequence, and the size of the transmission-uncompleted service data packet of the network device is less than or equal to a first threshold.

16. A data transmission apparatus, comprising:

one or more processors; and a memory configured to store a processor-executable-instruction;

wherein the one or more processors, when collectively executing the processor-executable instruction, cause the data transmission apparatus to act as a terminal and to:

determine a first transport block size;

determine a relationship between a size of a service data packet of the terminal and the first transport block size; and transmit the service data packet of the terminal based on the first transport block size, and transmit an indication message based on the relationship between the size of the service data packet of the terminal and the first transport block size;

wherein transmitting the indication message based on the relationship between the size of the service data packet of the terminal and the first transport block size comprises:

the size of the service data packet of the terminal being greater than the first transport block size, and sending a first indication message, wherein the first indication message is configured to indicate that there is a transmission-uncompleted service data packet of the terminal; and wherein the one or more processors, when collectively executing the processor-executable instruction, further cause the data transmission apparatus to:

continue to transmit, after an interval of a first number of time units since sending the first indication message, the transmission-uncompleted service data packet of the terminal.

17. A non-transitory computer readable storage medium where, when an instruction in the non-transitory computer readable storage medium is executed by one or more processors of a mobile terminal, the mobile terminal is caused to execute the data transmission method according to claim 1.

18. A data transmission apparatus, comprising:

one or more processors; and a memory configured to store a processor-executable-instruction;

wherein the one or more processors, when collectively executing the processor-executable instruction, cause the data transmission apparatus to perform the data transmission method according to claim 9.

19. A non-transitory computer readable storage medium where, when an instruction in the non-transitory computer readable storage medium is executed by one or more processors of a network device, the network device is caused to execute the data transmission method according to claim 9.

* * * * *